Sept. 23, 1969     S. E. CARLSSON     3,468,500
ARRESTING GEAR FOR AIRCRAFT AND OTHER VEHICLES
Filed Dec. 1, 1966     2 Sheets-Sheet 1
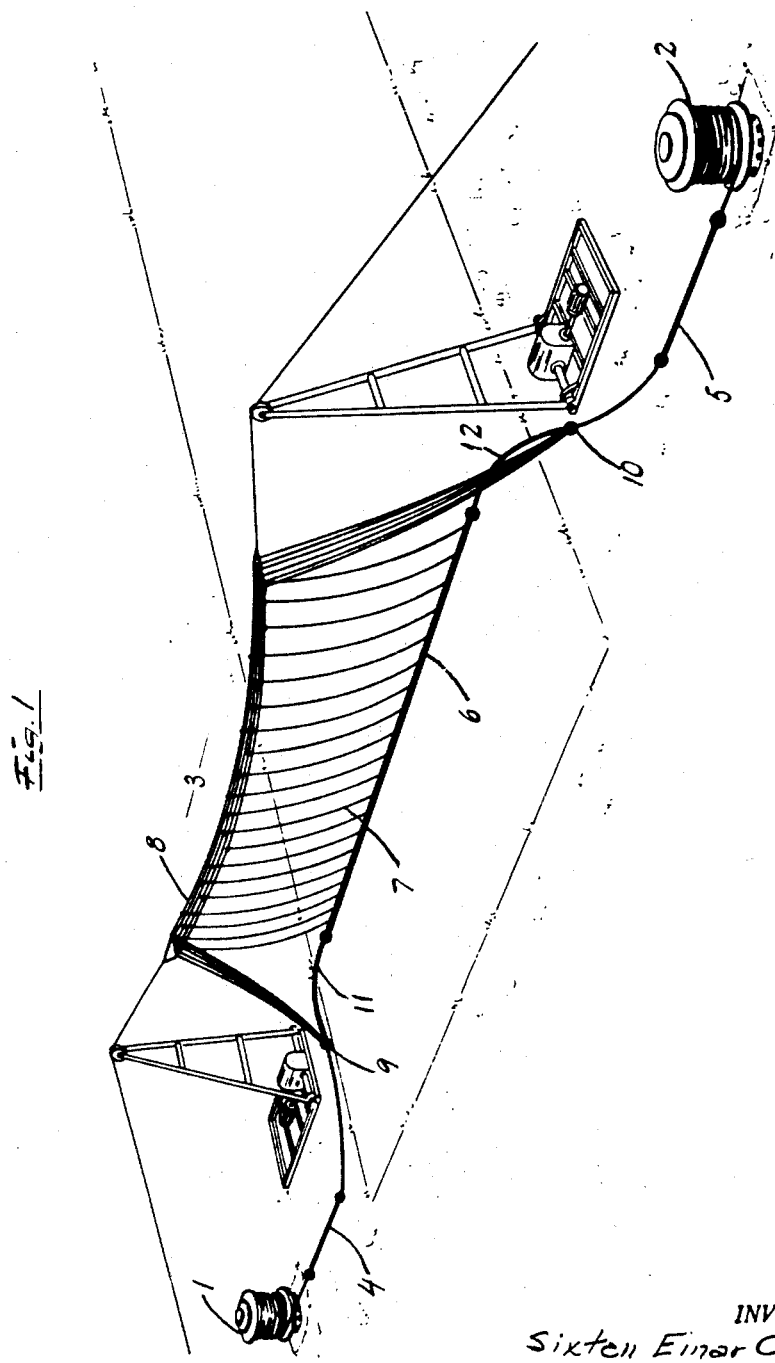
INVENTOR.
Sixten Einar Carlsson Sept. 23, 1969  S. E. CARLSSON  3,468,500
ARRESTING GEAR FOR AIRCRAFT AND OTHER VEHICLES
Filed Dec. 1, 1966  2 Sheets-Sheet 2
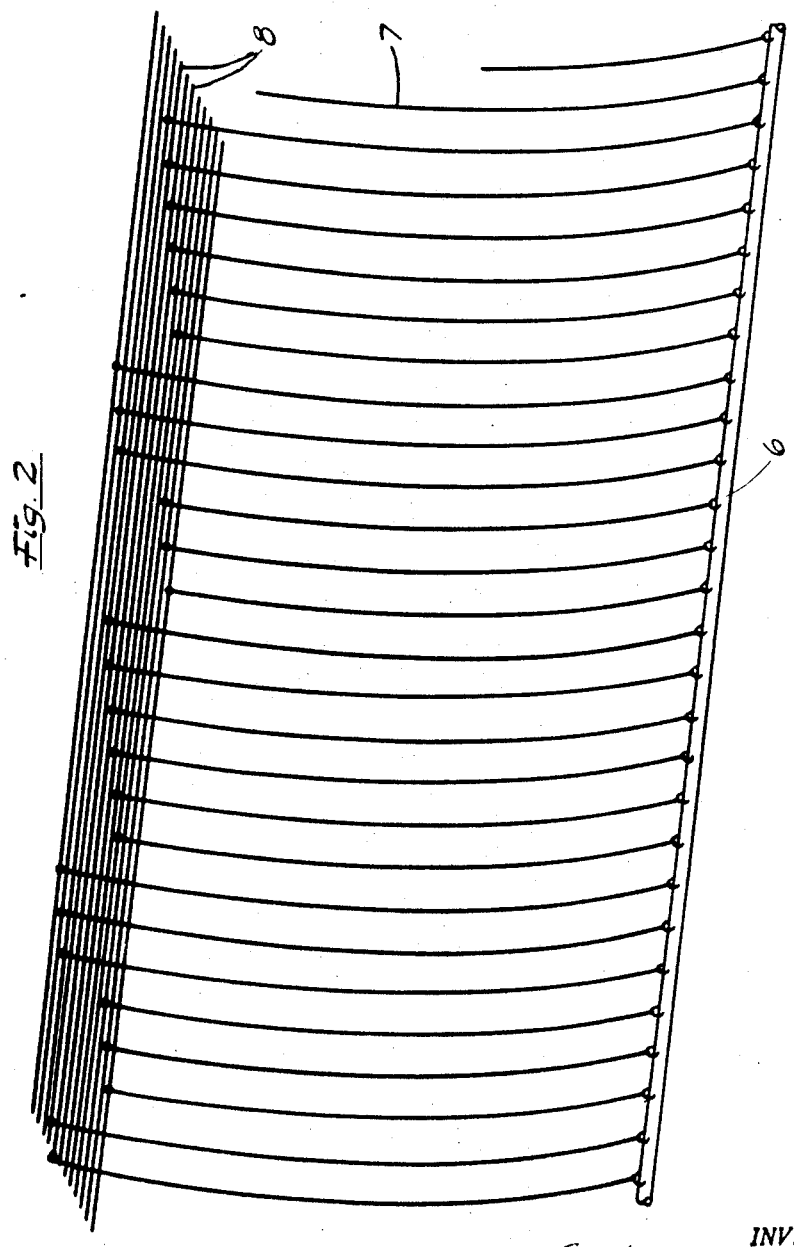
INVENTOR.
Sixten Einar Carlsson
BY

United States Patent Office 3,468,500
Patented Sept. 23, 1969

3,468,500
ARRESTING GEAR FOR AIRCRAFT AND OTHER VEHICLES
Sixten Einar Carlsson, Norrkoping, Sweden, assignor to Borgs Fabriks AB., Norrkoping, Sweden
Filed Dec. 1, 1966, Ser. No. 598,456
Claims priority, application Sweden, Dec. 1, 1965, 15,584/65
Int. Cl. B64c 25/68; B64f 1/02
U.S. Cl. 244—110          3 Claims

ABSTRACT OF THE DISCLOSURE

This disclosure provides an arresting device for aircraft and other vehicles comprising a net having upper and lower cables. The upper cable consists of a plurality of separate lines or strands. Vertical lines connect the upper and lower cables. Each of these vertical lines is connected at one end to a single one of the strands of the upper cable.

BACKGROUND OF THE INVENTION

The present invention relates to an arresting device for aircraft and similar vehicles and particularly for stopping the craft within a small area such as a ship's deck.

More particularly the invention contemplates an arresting net comprising upper and lower cable lines, the upper one of which has a greater number of strands than the lower cable line.

It is known to equip airports with apparatus for arresting aircraft, which for various reasons often are unable to land within an available space. In many cases the aircraft is arrested by means of a barrier net that is attached at both ends to one or more braking devices which, when it is desired to quickly halt the plane or when the plane overshoots a desired point of landing, bring the plane to a stop within a comparatively short distance.

Various types of nets have been devised for this purpose and such nets can be divided into two main groups, namely the so-called "full" net and the compound net. The full net principally comprises an upper and a lower rope or cable connected together by vertical strands or ropes. The vertical ropes tend to wrap themselves around the leading edge of the main wings of the aircraft and by making the said vertical lines or ropes of a highly elastic material, a certain distribution of load across the span of the wings can be provided for. Nets constructed according to this principle are sturdy and can be used repeatedly. Also nets of this type can also be used in conjunction with arrester hooks, and thus aircraft provided with landing hooks, as well as those not having them, can be halted by the same landing arresting device.

Compound nets are barriers composed of a number of elementary nets which are disposed parallel to one another. Nets of this kind are composed of upper and lower cable lines having vertical arresting lines or strands secured between them, the vertical lines engaging over the leading edge of the main wings of the aircraft, but in this case only one, or just a few of the vertical lines of the net act on the aircraft, the total effect being obtained by a number of the net units having mutually laterally displaced vertical lines arresting the aircraft at the same time. Such compound nets, however, are complicated and considerable time is required to re-set them once they have been used. Moreover, these compound nets are heavier than the so-called "full" net previously mentioned, but actually have, on the other hand, the advantage of a much better load distribution around the aircraft, this distribution of load taking place without regard to the shape of the aircraft, thus permitting greater variation in the shape and size of the aircraft in relation to the net.

An additional difference between the two types of nets is that the full net gives a relatively concentrated load on the upper surface of the aircraft whereas the compound net distributes this load over a wide area. Since the upper surface of the aircraft, even in the case of particularly solidly-built military aircraft, is often relatively sensitive and weak and since the compound net gives a more positive distribution of load over this area, where the crew is generally located, the distribution of load on the upper surface of the aircraft constitutes an important advantage.

On the other hand, the compound net cannot be used when an arrester hook is also being used, which means that the use of such nets is materially restricted.

SUMMARY OF THE INVENTION

The present invention relates to an arrester net for aircraft and other vehicles which comprises substantially horizontal upper and lower cable lines arranged in substantially parallel spaced relationship, when the net is in a raised position, and joined together by vertical lines or strands, the invention being characterized in that the upper cable line comprises a greater number of strands than the lower cable line.

It is, therefore, an object of the invention to provide a net which will possess the advantages of the two types of nets heretofore described but one which will not possess their disadvantages. The net constructed according to the recent invention thus offers a relatively simple and sturdy structure and at the same time provides for a good distribution of the load over the upper surface of the aircraft. Furthermore, the design of the net prevents the vertical lines or cables from sliding off aircraft having a pronounced swept-back wing, which often occurs and is a distinct drawback in the case of certain types of compound nets. The good load distributing characteristics of the compound net are also retained. Owing to the fact that the net has, for example, only one lower line it can also be used as an arrester wire when the aircraft uses its arrester hook.

With these and other objects to be hereinafter set forth in view, I have devised the arrangement of parts to be described and more particularly pointed out in the claims appended hereto.

BRIEF DESCRIPTION OF DRAWINGS

In the accompanying drawings, wherein an illustrative embodiment of the invention is disclosed:

FIG. 1 is a perspective view of a net constructed in accordance with the invention and in a raised operative position, and FIG. 2 shows a section of the net in a larger scale.

DESCRIPTION OF SPECIFIC EMBODIMENTS

A net 3 is shown located between two brakes 1 and 2, the net including elastic members 4 and 5, one of which is disposed on either side of the net for adjusting the total elastic properties of the arresting system, if such adjustment with respect to size is judged necessary. One bottom cable line 6 is provided and from which a number of vertical strands or cables 7 extend, said vertical strands or cables 7 being made of a highly elastic material such as nylon or the like and these vertical strands are connected at their upper ends with the strands which compose the upper cable line 8, said strands being arranged parallel to one another. The strands constituting the cable line 8 in the embodiment shown are much thinner than the lower cable line. The various strands of the upper cable line are connected with the lower cable line at points 9 and 10 at both of the ends of the net, so that the load from the brakes is distributed both to the lower cable line and to the strands of the upper cable line. Furthermore, two or more elastic elements 11 and 12 are inserted in the lower cable line and, if found necessary for reason of the dimensions, are employed to compensate for possible differences in the elasticity of the upper cable line strands and the lower cable lines and to insure a suitable ratio between the elasticity in the lower cable line and the strands of the upper cable line, which are expected to be subjected to a load when an aircraft is engaged by the net.

As can be seen from FIG. 2, the vertical strands 7, extending upwardly from the bottom cable line 6 are connected to certain of the strands of the upper cable line within certain unit lengths of the net, which, however, with respect to its whole length, also has vertical strands extending between the same lower cable line and strands of the top upper cable line.

Since the bottom cable line is connected with different strands of the upper cable line group, the question arises as to the order in which this arrangement shall be effected. Apart from the fact that the selected order is periodically repeated after a length of the line which corresponds to approximately one-half or less of the span of the aircraft, the sequence should be so chosen that within such group the amount of net embracing the aircraft is as uniform as possible, irrespective of where the nose of the aircraft strikes the net. This is provided for by means of a sequence which by way of example is indicated in FIG. 2.

Since the net as shown is provided with one single, strongly made lower cable line, the net can also be used as an arrester wire for arresting the aircraft by means of its arrester hook such as in the manner described in U.S. Patent 3,128,972.

Furthermore, the net can be so designed that it may be raised or lowered according to any of the methods known at present and which have been developed for this purpose.

What I claim is:

1. An arresting device for aircraft and similar vehicles comprising, a net having upper and lower cable lines ararnged in substantially vertically spaced relationship when the net is in a raised position, at least the upper cable being composed of horizontnally disposed, separate strands, vertical lines extending between the upper and lower cables, each of the vertical lines at the top being connected separately to a single horizontally disposed strand in the upper cable.

2. An arresting cable for aircraft and similar vehicles comprising, a lower cable having its opposite ends respectively attached to an elastic line, an upper cable, each of the cables being attached at its opposite ends to the end of an elastic member, each of said members being connected to brake means, the upper cable consisting of a plurality of separate strands which connect at their ends to the elastic members at points thereon remote from the points of connection of the lower cable thereto, and a plurality of vertical lines extending between the lower cable and the upper cable, the vertical lines being coupled to different strands in the upper cable.

3. An arresting device for aircraft and similar vehicles comprising, a lower cable having its opposite ends attached to lines that connect to brake means, an upper cable connected to the brake means, said upper cable consisting of a plurality of separated strands, which strands connect at their ends to the lines at points remote from the points of connection of the lower cable thereto, and a plurality of vertical lines extending between the upper cable and the lower cable, each of said vertical lines being connected at its upper end to a single one of the strands of the upper cable.

References Cited

UNITED STATES PATENTS

| | | | |
|---|---|---|---|
| 3,069,118 | 12/1962 | Bernard | 244—110 |
| 3,077,323 | 2/1963 | Fonden et al. | 244—110 |
| 3,089,673 | 5/1963 | Fonden et al. | 244—110 |
| 3,098,629 | 7/1963 | Fonden et al. | 244—110 |
| 3,128,972 | 4/1964 | Fonden et al. | 244—110 |
| 3,212,736 | 10/1965 | Fonden et al. | 244—110 |

MILTON BUCHLER, Primary Examiner

P. E. SAUBEKER, Assistant Examiner